United States Patent [19]

Di Pietro Elizaran

[11] 4,275,445
[45] Jun. 23, 1981

[54] DELAYED ACTION ELECTRICAL PROTECTION DEVICE, DEPENDING ON AN ADJUSTED MAGNITUDE

[75] Inventor: Rodolfo Di Pietro Elizaran, Bilbao, Spain

[73] Assignee: Arteche, Instrumentacion y Systemas Electronicos, S.A., Spain

[21] Appl. No.: 27,252

[22] Filed: Apr. 5, 1979

[30] Foreign Application Priority Data

Apr. 13, 1978 [ES] Spain ..................................... 468.764

[51] Int. Cl.³ .............................................. H02H 3/08
[52] U.S. Cl. .................... 364/480; 364/200; 361/35
[58] Field of Search ...................... 364/480, 200, 119; 361/35

[56] References Cited

U.S. PATENT DOCUMENTS

| 3,569,785 | 3/1971 | Durbeck et al. ................. 364/492 X |
| 3,842,249 | 10/1974 | Geyer et al. ........................ 364/492 |
| 3,931,502 | 1/1976 | Kohlas ................................. 364/492 |
| 3,972,470 | 8/1976 | Takagi ................................. 364/492 |
| 3,984,737 | 10/1976 | Okamura et al. ................. 364/492 X |
| 4,075,699 | 2/1978 | Schneider et al. .................. 364/492 |
| 4,161,027 | 7/1979 | Russell ............................... 364/492 |

*Primary Examiner*—Edward J. Wise
*Attorney, Agent, or Firm*—Eyre, Mann, Lucas & Just

[57] ABSTRACT

The invention relates to an electrical protection device. According to the invention an adjusted signal is monitored to detect the presence of unwanted disturbances. A microprocessor is used to calculate a delay time for tripping in accordance with the comparison of this signal to calculated values within the microprocessor.

7 Claims, 2 Drawing Figures

DELAYED ACTION ELECTRICAL PROTECTION DEVICE, DEPENDING ON AN ADJUSTED MAGNITUDE

This invention enables a new electrical protection device to be obtained, which is controlled by a magnitude that is adjusted by a time relay depending upon it, and, as will be seen from the ensuing specification of the invention, it takes over the functions that are at present performed by different kinds of protection devices, and it can perform same with an increased degree of accuracy, while it furthermore combines them all, and obviates certain errors which up to now had been impossible to overcome.

Figure 1:
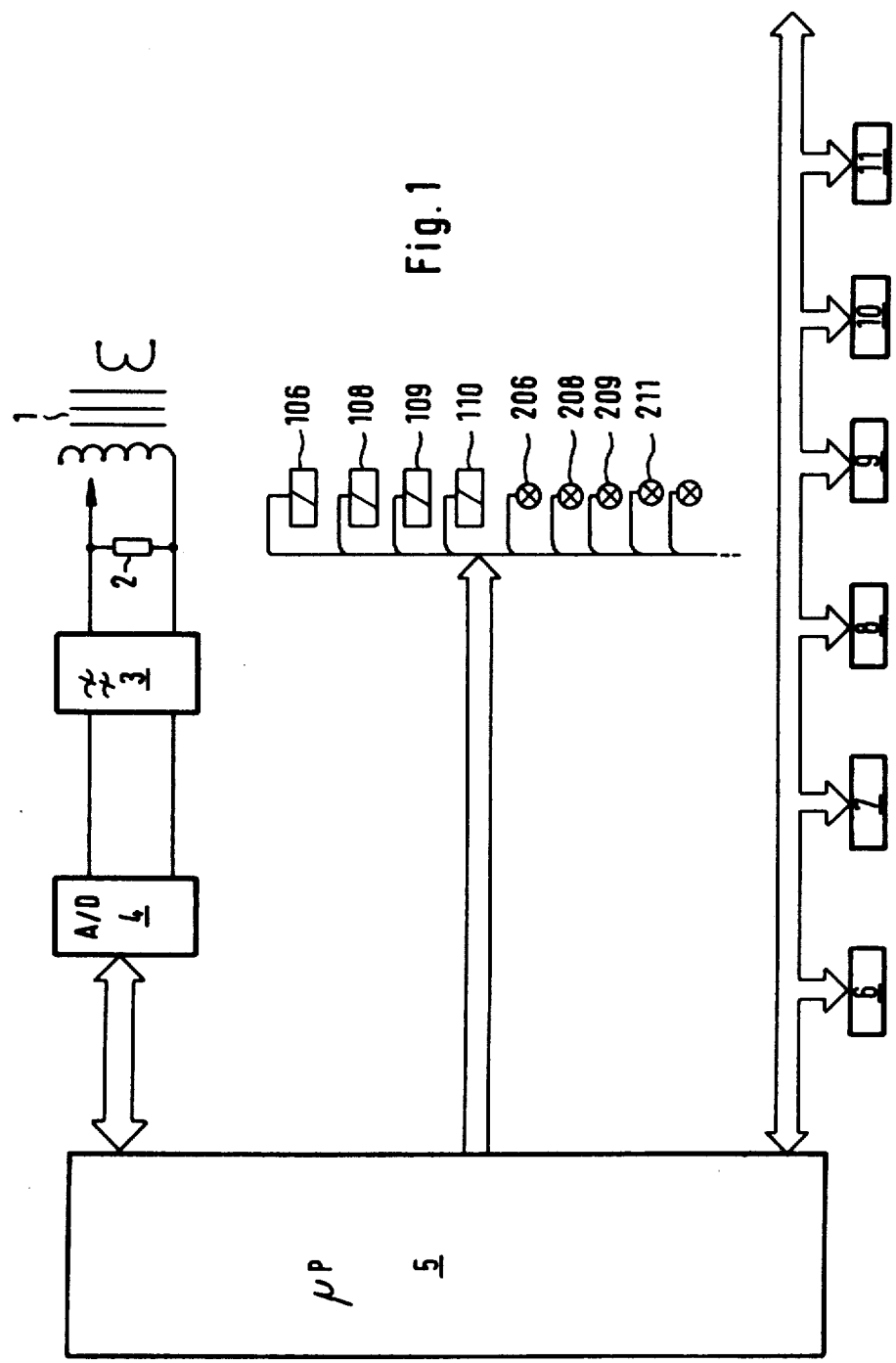
FIG. 1 is a diagram of the new protection device covered by this invention.

Notations as follows are used in these figures:
1. Transformer.
2. Resistance.
3. Band pass filter.
4. Digital analogical converter.
5. Microprocessor.
6. Desired nominal current value selector.
7. Desired additional constant time value selector.
8. Desired instantaneous trip value selector.
9. Desired watch time value selector.
10. Desired reset time value selector.
11. Desired locking time value selector.
106. Dependent time trip output relay.
108. Instantaneous trip output relay.
109. Second order alarm output relay.
110. Reset output relay.
206. Preset value (6) trip signal.
208. Preset value (8) trip signal.
209. Preset value (9) trip signal.
211. Preset value (11) trip signal.

For the sake of simplicity in the explanation, the invention is first described with reference to one of the functions it can perform (which is that concerned when it behaves in the same way as an overload relay), and thereafter reference will be made to the other functions it embodies.

Up to now, electro-mechanical relays of an induction disc design have been used as overload relays for generating time characteristic curves. Here the inertia of the disc caused errors to arise when obtaining such curves, and moreover it made the disc travel excessively in its angular motion when the current transformer secondary current descended, so that upon thus continuing to revolve, the disc would cause the trip circuit to close (this phenomenum being called over-reach), while furthermore the inertia thus produced would cause a considerable consumption in the current transformers, which made them increasingly expensive.

Subsequently, electronic circuits appeared, which generated inverted time functions. The relays provided in electronic circuits of this type have been shown to have superior features to those possessed by electro-mechanical relays, and thus improve upon the consumption and over-reach aspects, while furthermore they provided an improvement as regards repeatability errors with respect to time measurement. However, the manufacture of these pieces of equipment is relatively complex, because of the selection that has to be made of the components which comply with the time characteristic curve requirements. These difficulties were partially overcome by incorporating circuits that were based on the use of analogical operational amplifiers, whose supply network possessed non-linear reply components, which produced a non-linear transfer characteristic in the circuit. Nonetheless, such circuits involve complexities as regards obtaining a certain time characteristic curve, on the basis of a given transfer characteristic for such circuits. Moreover, since these circuits are analogous ones, they involve manufacturing difficulties, drifts, and the need to preset the input signal in order for the output signal to be directly proportional to the operational amplifier input signal (that is to say, the so called "offset" phenomenum, etc).

The present invention enables all the aforementioned drawbacks to be overcome, and to this end, it is based upon the use of a digital micro-processor, which allows all adjustment procedures during manufacture to be eliminated, and for any kind of timing characteristic curve to be obtained.

The new delayed action protection device depending on an adjusted magnitude, as may be seen from FIG. 1, is comprised of:

A transformer (1) for adapting the current in the line it is proposed to protect, where said transformer is fitted with a number of taps to allow the transformation ratio to be adapted.

A resistance (2), wherein a voltage proportional thereto appears whenever a current that is proportional to the primary current circulates in it. This voltage is filtered by the band pass filter (3) which rejects the peaks and troughs.

A digital analogical converter (4), which turns the above signal into a digital reading for subsequent processing. Such signal conversion may either be accomplished by the use of a digital analogical converter, such as that illustrated in FIG. 1, or by the use of a digital analogical converter (not illustrated) which is governed by the processor. The processor compares the signal it receives against the preset values. Such preset values are predetermined in a digital form, either by means of codified digital switches provided for the purpose, or by means of instructions transmitted in digital form from outside.

From now onwards, the processor is in possession of sufficient data to enable it to take decisions to trip and to calculate the times suitable for each situation.

Figure 2:
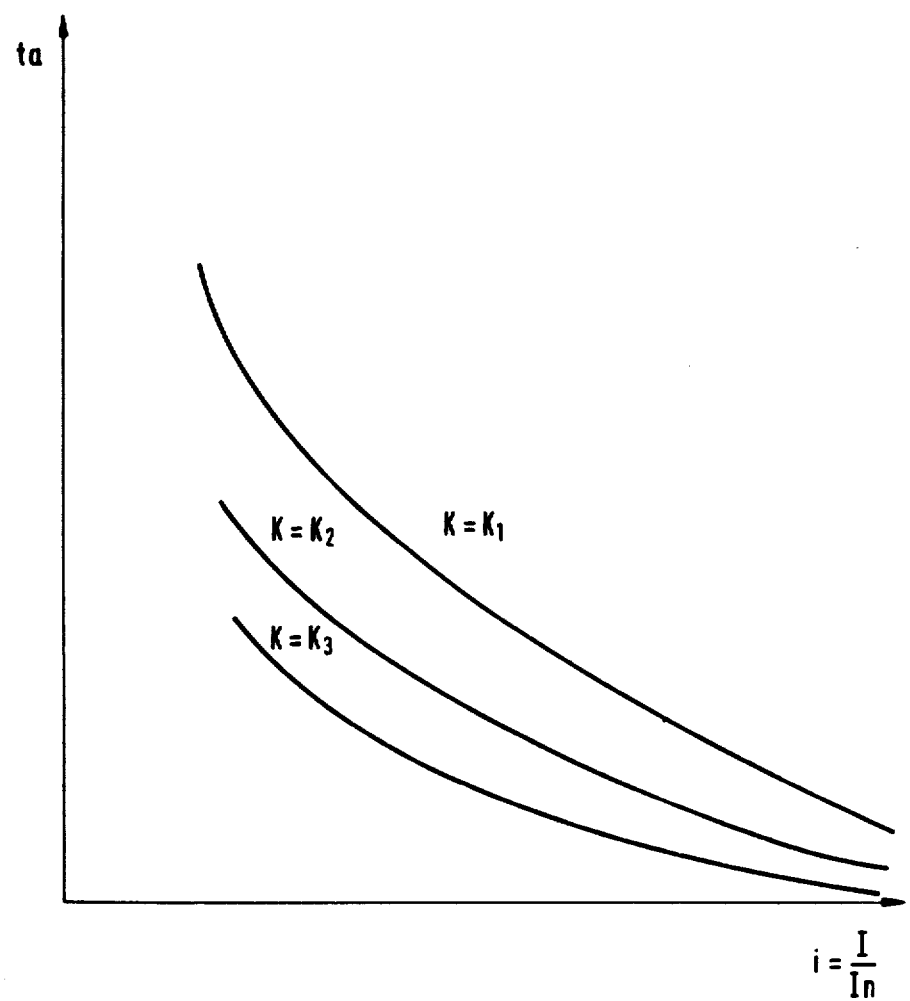
FIG. 2 depicts a family of three characteristic curves as obtained by plotting the change over delay time, shown on the vertical axis, against a dependent magnitude which, in this case, is comprised by the ratio between the real current (I) flowing in the circuit to be protected, and the nominal current ($I_n$) thereof.

There are two different modes of operation envisaged:

In the first mode of operation, the tripping delay times (ta) (See FIG. 2) are obtained by direct calculation on the basis of the equations which define different kinds of curve. Hence, on the assumption that an extremely inverse curve as defined in B.S. 142 has been chosen in the protection, the equation defining the delay is:

$$ta = K/(i^2 - 1),$$

where $i = I/I_n$; that is to say, the ratio between the real I value which flows through the current transformer (1) primary, and the nominal $I_n$ value as rated or preset in the protection by the selector (6); and where K is a constant comprising another of the preset values. Three time curves are shown in FIG. 2, and these correspond to three values of K=K1, K2 and K3 respectively.

In a first step, the μP calculates the value of i by means of the real current and the nominal value. On the other hand, and as has already been mentioned, constant K is a preset value incorporated into the protection, and which defines the particular timing characteristic for K=K1; K=K2; K=K3, etc., from among the family of curves.

Thereupon, by applying these two values K and i to the B.S. equation, the micro-processor calculates the tripping delay time. (ta).

Bearing in mind that the real current value (I) during the disturbance will not necessarily be constant, but will rather develop with respect to the time, the tripping delay time will need to be recalculated. Moreover, as the purpose here is to rival a Ferrari disc system which integrates values with the course of time, the same needs to be done in this case; that is to say, when a new value of ta is calculated, it must be influenced by the "history" in the disturbance from the time it appeared, or, in other words, the protection must be such as to take account of the time elapsed up to the moment when the real current value (I) alters.

This correction is made in the following manner: at the instant when the first disturbance appears, the value of ta1 is calculated, and the time begins to be measured; while in following time intervals, the measurement goes on being analysed, and if there is any variation in such measurement, then the new time is calculated as follows:

$$ta2(\text{remainder}) = (1 - (T1/ta1)) \cdot ta2,$$

where:

$ta^2$ (remainder) denotes the time that must elapse before tripping with the new i2 ratio takes place, and in which time, account is taken of the disturbance development "history;"

T1 is the time elapsed with i1 up until when the second current (and hence the i2 current) appears;

$ta^1$ denotes the trip delay time which would have existed in case 1, that is to say, the tripping delay time as calculated on the basis of i1;

$ta^2$ is the trip delay time which would have existed in case 2, that is to say, had i2 been present from the very moment the disturbance appeared.

In this manner, the real operating time is an integer in function to the disturbance development, in the same way as happens with the Ferrari type electro-mechanical relay. Once the last $ta^2$ (remainder) updated time has elapsed, the μP gives the order for the output relay (106) to close.

In the second mode of operation, the trip delay time is calculated with tables instead of being determined by direct calculation.

To this end, a pre-adjusted timer which increments at fixed intervals of time, is placed in the Central Processing Unit, and tripping of the protection takes place when the timer value is equal to or exceeds a prescribed preset value. This value is obtained by means of a previous study of the curve to be obtained, of the admissible ta errors, and of the available calculating speed.

The required integration, together with the obtainment of the tripping delay times, are achieved by varying the timer increment magnitudes in function to the ratio i between the real current and the nominal current values.

For example:

Let the timer prescribed value be 5,000;

Let the timer interval incrementing time be 5 m.secs.;

Let 1 sec. be the tripping delay time for twice the nominal current. This means that when such overloading is maintained constant throughout the disturbance, the timer increment value is $\Delta c = 5000 \times (0.005)/1 = 25$;

Let 0.5 seconds be the tripping delay time for four times the nominal current. In this case (assuming that this overload remains constant throughout the whole disturbance) the timer increment value is $\Delta c = 5000 \times 0.005/0.5 = 50$.

The protection equipment gauges the current, and finds a value twice as large as the nominal current, and using this value, it refers to the increment table where it finds a $\Delta c$ value equal to 25, this value being added to the timer every 5 m.secs., and in the event of there being no alteration to the adjusted magnitude i, the timer will reach its prescribed value of 5000 after 200 intervals have elapsed, whereupon the elapsed time will be 1 second. Once the prescribed value is reached, the μP gives the order for the output relay (106) to close.

Let it now be assumed that the disturbance develops fourfold during the time counting period. The new measurement will then obtain an increment value of $\Delta c$ equals 50, this being the new increment to be added in the timer; this moreover having integrated that time during which the disturbance remained at twice the nominal current value, and henceforth the timer will add a series which is double to what it was in the preceding case, since the trip delay time is now half what it was before.

It is to be noted that if at any time during the process, the real current (I) drops below In, the timer returns to zero immediately.

This system rivals the electro-mechanical disc type relay insofar as time integration is concerned, because the value reached by the timer whilst the disturbance has a value of i=2 is analogous to the motion undergone by the induction disc throughout that time; and, when the disturbance increases, and with it the timer $\Delta c$ increment, the integration process is similar to the disc speed increase.

The timing characteristic curve thus obtained is a jagged approximation to the desired curve; but nonetheless, by choosing the timer prescribed value, the time interval for timer increment, and the average current value, all in a suitable manner, it becomes possible to obtain an average whose errors are very much smaller than those normally obtained in the standards by which these curves are defined.

It is to be noted that the timer characteristic curves may be any curve, and amongst these are the ones obtained on the basis of the time curves specified under B.S. 142; but here a fixed, additional and optional time is added to the said curve delay times, this not being dependent upon the parameter being gauged (which in the case here, is the current). Said fixed, additional and optional time comprises one of the prescribed values in a reference magnitude to be determined by (7).

Up to now an explanation has been given as to the behaviour of the protection, by way of a description of its components and its operation when it performs the function of an inverted time overload relay, but its functions do not end here, but instead the same components as above, and simultaneously therewith, may optionally embody an instantaneous trip feature, operating as from a given value of i, where this value is considered as the prescribed value, and must be defined when said feature is used. In this case, the protection will behave like an instantaneous overload protection relay. The prescribed value of i is set upon the desired instantaneous trip value selector (8), and in this case, the microprocessor gives an output signal which closes the instantaneous trip relay (108) when the prescribed value set on the selector (8) is exceeded.

The protection device may also simultaneously adopt other functions too, as for example perform a constant watch whereby the processor ensures that the magnitude to be measured (adjusted magnitude) develops in the proper direction; or, for example, to ensure that the present current (I) descends below In before the end of a predetermined period of time as preset on the desired watch time value selector (9). In the event where, upon expiry of such watch time, the adjusted magnitude has failed to develop in the proper direction, the protection will cause the second order alarm output relay (109) contacts to trip. In this way, a watch is kept, for example, to ensure that after the protection has ordered the circuit to trip, and where such condition was caused by a fault in the operation of a switch, then such tripping will not take place; whereupon and by virtue of this new function, once it is checked that no tripping has taken place within the time as preset on selector (9), the switch operating failure is detected and thereupon the alarm is given by means of its output relay (109), this being a second order alarm, because it denotes that a disturbance has taken place, that the protection device ordered action to be taken, but that no such action was taken.

Moreover, the protection device constructed in accordance with this invention may embody further watch functions, and in this regard there is the one whereby the processor watches the development of the disturbance, and if same disappears, then the processor allows a period of time to elapse (as pre-established on the desired reset time value selector), at the expiry of which, the adjustment component (110), comprising an output relay, closes its contacts and re-establishes the service, in such a manner that there is the possibility of an automatic service resetting feature which operates when the disturbance causing it to trip at the end of a certain length of time, has disappeared.

Moreover, the invention being dealt with here may also ensure that if, before a further period of time has elapsed (as preset on the desired locking time value selector (11), and which may here be termed "the locking time," the disturbance was to reappear, then the function restoring function, as referred to in the preceding paragraph, would become locked, and thus prevent operation of the reset output relay (110). In this way, the risk of "clicking" is avoided, that is to say, when the service restoring function has operated, there is a reappearance of the disturbance and as a result tripping recurs, whereupon the service restoring service operates again, and so on, wherewith the main switch goes on opening and closing continually due to the real cause of the disturbance not having been eliminated. With this function as described, the invention would act as a protection against successive recurrences of the disturbance.

Each one of the aforementioned functions, (with the exception of the desired additional constant time value selector (7), caters for memorizing and signalling of its operation by means of light emitting diodes (LED), which will remain lighted until such operation is erased from their memory, which may either be accomplished locally (by means of a press button), or by means of outside signals.

Hence, signal (206) shows tripping at the value prescribed on the desired nominal current value selector (6).

Signal (208) shows tripping at the value prescribed on the desired instantaeous trip value selector (8).

Signal (209) shows tripping at the value prescribed on the desired watch time value selector (9).

Signal (211) shows tripping at the value prescribed on the desired locking time value selector (11).

From all the foregoing, it may be seen how, in accordance with the invention being dealt with here, it is envisaged that in a single protection device, and in a combined manner, it is possible to perform simultaneously the functions of an inverted time overload relay, an instantaneous overload relay, a switch operation failure detector, or second order alarm, and a service restoring relay, with protection against multiple recurrence of the disturbance.

The new electrical protection device covered by this invention may obviously be used too for the purpose of performing solely one of the functions described above, by means simply of suppressing the others.

I claim:

1. A delayed action electrical protection device intended for protection of electrical lines and equipment against electrical disturbances comprising:
   (a) an analog-to-digital converter for converting an adjusted monitored signal to digital format signal;
   (b) a micro-processor for receiving said digital format signal and relating it to reference values from timing characteristic curves;
   (c) said micro-processor providing at least one relay tripping signal for electrical protection; and
   (d) said tripping signal being delayed by a varying amount according to the following formula:

$$t_a = (K/i^2 - 1)$$

wherein $t_a$ = the delay time for actuating said tripping signal
$i = (I/I_n)$
I = the actual current of the monitored signal
$I_n$ = a preset reference value of current
and
K = a predetermined constant.

2. The delayed action electrical protection device of claim 1 wherein the tripping signal delay time is updated according to the formula $t_{a2}$ (remainder) = $(1 - (T_1/t_{a1}) \cdot t_{a2}$ wherein $t_{a2}$(remainder) denotes the time which must elapse before tripping at the second successive current ratio $i_2$, where i is defined as in claim 1.

$T_1$ is the elapsed time from the determination of i, where $i_1$ is the previous current ratio and i is defined as above;

$t_{a1}$ is the trip delay time based on the previous determination at $i_1$; and $t_{a2}$ is the trip delay time which would exist had $i_2$ been present initially.

3. A method for protecting electrical lines of equipment against electrical disturbances comprising the steps of:
(a) monitoring the desired signal;
(b) providing an adjusted magnitude signal derived from said desired signal;
(c) converting said adjusted magnitude signal to a digital signal;
(d) determining a delay time according to the formula:

$$t_a = K/(i^2 - 1)$$

wherein
$t_a$ = the delay time for actuating said tripping signal
$i = I/I_n$
$I$ = the actual current of the monitored signal
$I_n$ = a preset reference value of current
and
$K$ = a predetermined constant; and (e) providing a tripping signal whenever the electrical disturbance extends beyond said delay time.

4. The method of claim 3 further comprising the step of instantaneously providing said tripping signal whenever a preset value of the adjusted magnitude is exceeded.

5. The method of claim 3 further comprising the steps of monitoring the adjusted magnitude to determine the direction of variation of said magnitude and providing said tripping signal if the variation is in the wrong direction.

6. The method of claim 5 further comprising the step of monitoring said adjusted magnitude after tripping and resetting said tripping signal after a predetermined time has elapsed.

7. The method of claim 3 further comprising the step of indicating the performance of the protection device by lighting light-emitting diodes.

* * * * *